US006832665B2

(12) United States Patent
Crombeen

(10) Patent No.: US 6,832,665 B2
(45) Date of Patent: Dec. 21, 2004

(54) EXHAUST GAS MUFFLER

(75) Inventor: Peter F. Crombeen, Toronto (CA)

(73) Assignee: Advanced Car Specialties Limited, Toronto (CA)

( * ) Notice: Subject to any disclaimer, the term of this patent is extended or adjusted under 35 U.S.C. 154(b) by 0 days.

(21) Appl. No.: 10/152,312

(22) Filed: May 20, 2002

(65) Prior Publication Data

US 2003/0121722 A1 Jul. 3, 2003

(30) Foreign Application Priority Data

Feb. 1, 2002  (CA) ............................................ 2370012
Apr. 11, 2002  (CA) ............................................ 2381497

(51) Int. Cl.$^7$ .............................. F01N 1/08; F01N 5/00; F01N 7/08
(52) U.S. Cl. ...................... 181/275; 181/212; 181/227; 181/228; 181/264
(58) Field of Search ................................ 181/212, 227, 181/228, 231, 232, 236, 237, 238, 239, 247, 283, 264–276, 248–251

(56) References Cited

U.S. PATENT DOCUMENTS

| | | | | |
|---|---|---|---|---|
| 2,832,430 | A | * 4/1958 | Coombs ....................... 181/262 |
| 4,142,606 | A | * 3/1979 | Vanderzanden et al. ..... 181/231 |
| 4,147,230 | A | * 4/1979 | Ormond et al. .............. 181/231 |
| 4,265,332 | A | 5/1981 | Presnall et al. .............. 181/211 |
| 4,281,592 | A | 8/1981 | Maxson et al. .............. 98/38 R |
| 4,325,460 | A | * 4/1982 | Hoppenstedt ................ 181/259 |
| 4,444,288 | A | * 4/1984 | Sekiya et al. ................ 181/258 |
| 4,487,289 | A | 12/1984 | Kicinski et al. ............. 181/252 |
| 4,579,194 | A | 4/1986 | Shiki et al. .................. 181/231 |
| 4,697,668 | A | * 10/1987 | Barker ........................ 181/262 |
| 4,741,411 | A | 5/1988 | Stricker ....................... 181/283 |
| 4,926,638 | A | 5/1990 | Kakuta ......................... 60/319 |
| 5,058,704 | A | * 10/1991 | Yu .............................. 181/262 |
| 5,250,094 | A | * 10/1993 | Chung et al. ................. 55/523 |
| 5,371,331 | A | * 12/1994 | Wall ............................ 181/227 |
| 5,550,334 | A | 8/1996 | Langley ....................... 181/206 |
| 5,600,106 | A | 2/1997 | Langley ....................... 181/206 |
| 5,661,973 | A | * 9/1997 | Casey .......................... 60/279 |
| 5,902,971 | A | 5/1999 | Sato et al. .................... 181/262 |
| 5,996,733 | A | * 12/1999 | DeTuncq et al. ............ 181/250 |
| 6,009,703 | A | 1/2000 | Bouchez et al. .............. 60/274 |
| 6,213,251 | B1 | 4/2001 | Kesselring ................... 181/249 |
| 6,745,863 | B2 | * 6/2004 | Kanda et al. ................ 180/309 |

FOREIGN PATENT DOCUMENTS

| | | | |
|---|---|---|---|
| CA | 2370012 | 2/2002 | |
| CA | 2381497 | 4/2002 | |
| EP | 0536038 A1 | * 9/1992 | .......... F02M/35/08 |
| FR | 2570124 A1 | * 3/1986 | ............ F01N/3/26 |
| GB | 2139696 A | * 11/1984 | ............ F01N/1/24 |
| GB | 2307293 A | * 5/1997 | ............ F01N/3/26 |
| JP | 09273414 A | * 10/1997 | ............ F01N/3/02 |
| JP | 10299455 A | * 11/1998 | ............ F01N/3/02 |

* cited by examiner

Primary Examiner—Kimberly Lockett
Assistant Examiner—Patrick Miller
(74) Attorney, Agent, or Firm—Vidas, Arrett & Steinkraus

(57) ABSTRACT

An exhaust gas muffler for an engine, the exhaust gas muffler having a body, at least one inlet for the exhaust gas from the engine on the body, a baffled chamber in the body to receive exhaust gas from the at least one exhaust gas inlet, at least one exhaust gas outlet from the baffled chamber to vent the exhaust gas from the baffled chamber, at least one fresh-air inlet on the body, a heat exchange conduit extending into the baffled chamber between the fresh air inlet and the at least one exhaust gas outlet, the heat exchange conduit being sized and shaped to permit heat exchange between the fresh air and the exhaust gas in the baffled chamber, and a fresh air outlet on the heat exchange conduit, the fresh air outlet being sized, shaped and located relative to the exhaust gas outlet to permit the fresh air to mix with exhaust gases being vented from the baffled chamber to lower an exit temperature of the exhaust gases.

20 Claims, 3 Drawing Sheets

EXHAUST GAS MUFFLER

FIELD OF THE INVENTION

This invention relates to the general field of exhaust systems, and more particularly to mufflers used with internal combustion engines.

BACKGROUND OF THE INVENTION

Internal combustion engines generate by products of combustion often referred to as exhaust gases. Typically, for noise control the exhaust gases pass through a muffler and tailpipe before being released. Such engines and their associated exhaust systems are ubiquitous, being used to power all types of motor vehicles as well as smaller, more specialized vehicles and devices such as, for example, golf carts, ATV's, lawn tractors, power generators, and other turf and industrial equipment.

The exhaust gases from an internal combustion engine can be very hot, for example, over 1000° F. Such high temperatures can affect muffler components, in particular causing mufflers to wear out and require replacement faster than otherwise. Another problem is that the high exhaust temperature may cause "after bang" or "back firing" when unburnt or semi-burnt hydrocarbons, which may be contained in the flow are ignited upon contact with hot muffler components. High exhaust temperatures therefore are a potential safety hazard.

In conventional passenger and truck motor vehicles the exhaust gases generally cool to some extent through a long exhaust pipe between the engine and muffler. In smaller vehicles the exhaust pipe is likely to be short, with correspondingly hotter exhaust gases received by the muffler. Also, since the motor compartment in smaller vehicles is more crowded, the heat emanating from a very hot muffler is more likely to have an adverse affect on the performance or durability of neighbouring components. Thus, problems of high temperature exhaust gases can be more acute in smaller vehicles and motors. In many smaller motorized device applications the muffler may be somewhat exposed. As such, the muffler, if it gets very hot, becomes a safety hazard to users of the motorized device. One solution is for such mufflers to be built with an insulated double layer outer wall. This type of muffler lowers the surface temperature of the muffler, which usefully helps prevent burns to users who may have incidental contact with the muffler and also reduces heat damage to neighbouring components. However, the outer insulation in this type of muffler also magnifies the problem of high internal and tailpipe exit temperature for the exhaust gases.

Such problems have led to a different approach, which is disclosed in U.S. Pat. No. 4,265,332 to Presnall. This patent shows a muffler surrounded by a heat shield that defines an annular air passage 68 around the outer surface of the muffler. At the tailpipe output of the muffler the heat shield narrows. When in use, the exhaust gases exiting the tailpipe pass out the muffler and through the narrow part. This draws ambient air through the air passage 68. The ambient air flow cools the body of the muffler as it contacts the muffler's hot outer surface. The ambient air continues to flow around the muffler until it mixes with the exhaust gases to cool the exhaust gas output. Similar devices that also use an external heat shield, and that draw air through an air gap concentric to the muffler by means of a narrow venturi at the exhaust gas exit are shown in U.S. Pat. No. 4,741,411 to Stricker and U.S. Pat. No. 4,487,289 to Kicinski.

While these devices produce some cooling, the effect is limited since the cool air only passes past the outer skin of the muffler. The hot exhaust gas inside the muffler is relatively unaffected. Further, the external heat shield adds bulk to the muffler, which can be a problem particularly in smaller vehicles where the space is not available. This may force a costly redesign of the motor compartment and lead to a larger overall device. Also the external heat shield adds weight and expense to the muffler, and is not that easy to fabricate. Accordingly, in the absence of a more effective solution the durability and safety problems inherent to mufflers operating with high temperature exhaust are likely to continue.

SUMMARY OF THE INVENTION

What is desired is an exhaust muffler which overcomes one or more of the problems associated with the current devices and methods used for cooling exhaust mufflers.

Preferably, the operating temperature inside the muffler will be reduced, so that the muffler components are subjected to less heat stress and thereby achieve enhanced durability. The temperature of the exhaust gas output from the muffler will preferably also be reduced, producing a corresponding reduction in the risk of ignition of foreign materials and of back firing. It would be preferable as well if a heat shield or other bulky external device is not required, so that the muffler may be made as small as possible and thus more easily integrated into the existing motor compartments of the various internal combustion engine vehicles and devices.

Therefore, there is provided, according to a first aspect of the present invention, an exhaust gas muffler for an engine, said exhaust gas muffler having:

a) a body;

b) at least one inlet for said exhaust gas from said engine on said body;

c) a baffled chamber in said body to receive exhaust gas from said at least one exhaust gas inlet;

d) at least one exhaust gas outlet from the baffled chamber to vent said exhaust gas from said baffled chamber;

e) at least one fresh-air inlet on said body;

f) a heat exchange conduit extending into said baffled chamber between said fresh air inlet and said at least one exhaust gas outlet, said heat exchange conduit being sized and shaped to permit heat exchange between said fresh air and said exhaust gas in said baffled chamber; and g) a fresh air outlet on said heat exchange conduit, said fresh air outlet being sized, shaped and located relative to said exhaust gas outlet to permit said fresh air to mix with exhaust gases being vented from said baffled chamber to lower an exit temperature of said exhaust gases.

BRIEF DESCRIPTION OF THE DRAWINGS

Reference will now be made, by way of example only, to drawings illustrating the preferred embodiments of the invention, in which.

DETAILED DESCRIPTION OF THE PREFERRED EMBODIMENTS

Figure 1:
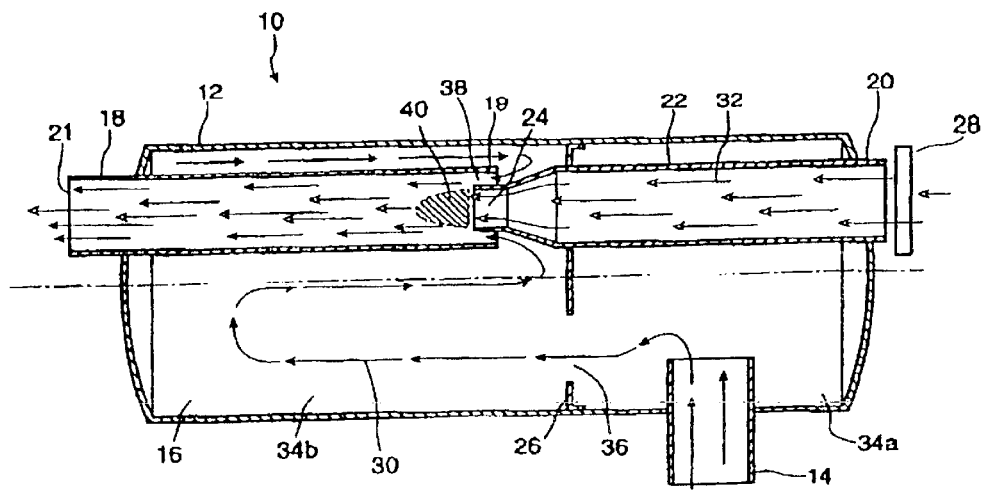
FIG. 1 is a side cross-sectional view of the exhaust muffler of the present invention.

The exhaust muffler of the present invention is shown in a side cross-sectional view in FIG. 1 and generally designated as 10. The exhaust muffler 10 generally comprises a body 12, at least one inlet 14, a baffled chamber 16, at least one exhaust gas outlet or tailpipe 18, at least one fresh-air inlet 20 on the body 12, a heat exchange conduit 22, and a fresh-air outlet 24. The baffled chamber 16 includes at least one baffle 26, and the fresh-air inlet 20 usually includes an air filter 28. The tailpipe 18 has an input end 19 inside the baffled chamber 16 and an output end 21 located outside the muffler 10.

The exhaust muffler 10 receives exhaust gas 30 through the inlet 14 and ambient air 32 through the fresh-air inlet 20. The exhaust gas 30 and ambient air 32 are shown as a series of arrows indicating the general flow of the gas and air through the device 10. For additional clarity and to distinguish the two gases, the exhaust gas 30 is represented by an open arrowhead and the ambient air 32 is represented by a closed, triangular shaped arrowhead. It can be seen from FIG. 1 that the ambient air 32 flows from the fresh-air inlet 20 through the heat exchange conduit 22 and fresh-air outlet 24 into the exhaust gas outlet or tailpipe 18, and is eventually expelled at the tailpipe output 21.

The exhaust muffler 10 of the present invention receives the exhaust gas 30 through attachment of the inlet 14 to an exhaust pipe carrying the gas away from an internal combustion engine (not shown). The exhaust gas 30 is the well-known gas produced by the engine upon completion of a cycle of combustion. This gas is generally very hot, for example, 1000° F. or more, and contains byproducts of combustion. The exhaust gas 30 flows through the baffled chamber 16 into the tailpipe input 19, and out of the muffler 10 at the tailpipe output 21. As is well known, the flow of gas 30 within the muffler 10 acts to reduce the loud sound or noise of the engine. In addition, the muffler 10 of the present invention functions to reduce the internal temperature of the muffler inside the baffled chamber 16, and also to reduce the temperature of the exhaust gas 30 at the tailpipe output 21.

The body 12 of the muffler 10 of the present invention may be any housing or enclosure adapted to receive hot exhaust gases ejected from an internal combustion engine. In most cases a body constructed from 14–22 gauge mild, aluminized or stainless steel has been found to be adequate. The outer walls of the body 12 will commonly be a single layer or double layer with or without separation by insulating material having the thickness of the gauge of steel being used.

The body 12 can be rectangular, oval, cylindrical, or any other shape. However, as will be appreciated by those skilled in the art, the body 12 will be sized and shaped to handle the exhaust gases being generated by a specific motor, and that can be installed in the motor compartment space available. For many small vehicle applications the muffler body 12 will be in the range of about 8 to 16 inches.

The present invention comprehends that the inlet 14 may be any form of conduit, tube, or other device on the body 12 that is adapted to receive the exhaust gas 30 from the engine. While there will be at least one inlet 14, it can be appreciated that some embodiments of the muffler 10 will have multiple inlets 14. In the preferred embodiment the inlet 14 is a tube welded or attached to a hole through a side wall of the body 12. Most preferably the tube is sized and shaped to form a secure and airtight fit with an engine exhaust pipe or outlet, and extends both inwardly and outwardly from the body.

The baffled chamber 16 defines a space in the interior of the body 12 that receives the exhaust gas 30 from the exhaust gas inlet 14. The baffle 26 is a sheet or plate, generally constructed of the same material steel as the body 12, that divides the chamber 16 into at least two internal compartments 34. There is at least one opening or hole 36 in the baffle 26 to enable the exhaust gas 30 to pass between the internal compartments 34. While the baffle 26 will most commonly be a single layer, a double or multiple baffle 26 such as that shown in FIG. 4 can also be used.

Figure 2:
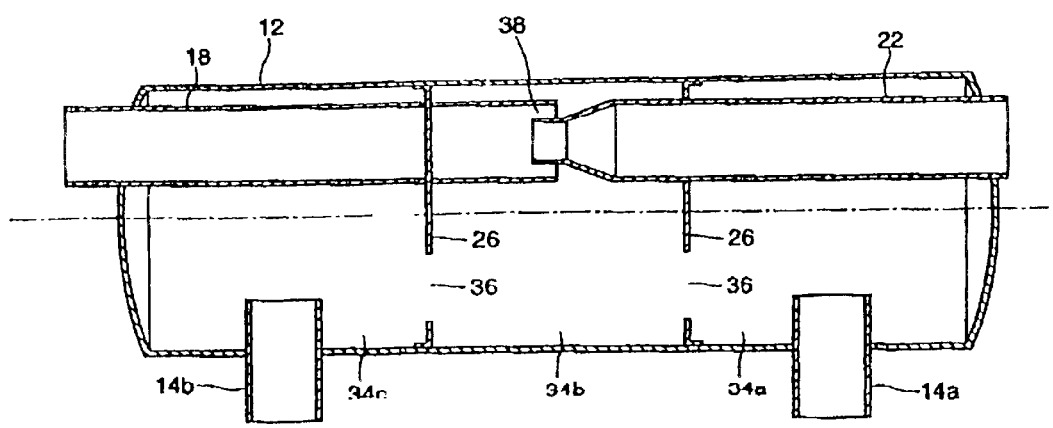
FIG. 2 is a side cross-sectional view of another embodiment of the exhaust muffler of the present invention.

In FIG. 1 the single baffle 26 divides the chamber 16 into two compartments, designated first internal compartment 34a and second internal compartment 34b. It can be appreciated that adding more baffles will increase the number of compartments 34 and the level of sound attenuation performed by the muffler 10. FIG. 2 shows an example of a muffler 10 having two baffles 26 and three compartments designated as first, second, and third internal compartments 34a, 34b, and 34c respectively. Similarly, a muffler having three baffles will be divided into four compartments 34. Of course, more chambers may be used if desired, and various forms of baffles and other muffling material may also be used in the chamber.

The present invention comprehends that the exhaust gas outlet or tailpipe 18 is a conduit, tube, or other device sized and shaped to vent the exhaust gas 30 from the baffled chamber 16 to the ambient air outside the muffler 10. In the preferred embodiment the tailpipe 18 is a conduit or tube made of an appropriate material as discussed above, that extends from the tailpipe input end 19 inside the baffled chamber 16 through a wall of the body 12 to tailpipe output end 21 outside the muffler 10. In this way, exhaust gas 30 and ambient air 32 that flow into the tailpipe 18 inside the baffled chamber 16 are able to flow outside.

As will be discussed in greater detail below, according to the present invention, that portion of the exhaust outlet 18 inside the baffled chamber 16 is sized and shaped to promote heat transfer between the exhaust outlet 18 and the exhaust gas 30 that is in the internal chamber 34 to which the exhaust outlet 18 is attached.

The present invention further comprehends that the fresh-air inlet 20 may be any passageway, conduit, tube, or other device on the body 12 that is adapted to receive the ambient air 28 from the atmosphere outside the muffler 10 and convey it to the heat exchange conduit 22. The fresh-air inlet 20 may accordingly be a tube welded or attached to a hole in the body 12, with an opening inside the body 12 that is sized and shaped to receive the heat exchange conduit 22. However, as discussed below, the fresh-air inlet 20 is preferably simply an outer or external end of the heat exchange conduit 22. This embodiment is preferred since it is a simpler configuration, requiring only one element instead of two, and since there would be no issue of interfacing the fresh-air inlet 20 with the conduit 22.

As shown in FIG. 1, the fresh-air inlet 20 preferably also includes the air filter 28 to prevent unwanted material such as grass, dirt, stones, and other airborne debris from entering or being drawn into the heat exchange conduit 22. The air filter 28 may be a screen, such as a wire mesh screen, a one-way baffle, or functionally any type of device configured to pass air but block physical particles larger than a predetermined minimum size. The air filter 28 may be attached to the fresh-air inlet 20 through any one of a number of well-known means such as a screw, bolt, or welded connection. Preferably the attachment is releasable so that the air filter 28 can be easily removed and cleaned, or replaced if damaged.

The heat exchange conduit 22 is a passageway, conduit, or tube configured to extend within the baffled chamber 16 between the fresh-air inlet and the exhaust gas outlet 18. The heat exchange conduit 22 can be of any convenient shape or length, as long as it functions to provide a connecting passage to carry ambient air 32 from the fresh-air inlet 20 to the exhaust gas outlet 18. Preferably the conduit 22 will be constructed from tubular steel, but it can be appreciated that other materials that are heat conductive, lightweight, durable, and that can function in a high temperature environment are also comprehended.

As noted, the heat exchange conduit 22 carries ambient air 32 inside a baffled chamber 16 filled with exhaust gas 30. Since the exhaust gas is invariably extremely hot, i.e. on the order of about 1000° F., the ambient air 32 will always be much cooler than the temperature inside the baffled chamber 16. Therefore, a process of heat exchange will occur between the hot exhaust gas 30 and the heat exchange conduit 22. In this process, a portion of the extreme heat of the gas 30 will transfer to the ambient air 32 inside the heat exchange conduit 22 and move out of the muffler 10 as the ambient air 32 flows out of the tailpipe output 21. This has the desirable effect of lowering the internal temperature of the muffler 10. Accordingly, the heat exchange conduit 22 will be sized and shaped to permit heat exchange between the fresh ambient air 32 and the exhaust gas 30 in the baffled chamber 16.

The present invention comprehends various ways to size and shape the heat exchange conduit 22 to promote such heat exchange in the muffler 10. One aspect relates to the material used to construct the conduit 22. The material should be heat conductive so that the heat from the exhaust gas 30 can be efficiently transferred through the wall of the heat exchange conduit 22 to the ambient air 32. Another aspect relates to enhancing heat exchange by decreasing wall thickness of the conduit 22. Accordingly, the material should also be sufficiently strong so that the wall of the conduit 22 can be made as thin as possible. In the preferred embodiment, the tubular steel used is both a good conductor of heat and can be fashioned into a tube having an adequately thin wall, while still retaining intrinsic strength. It can be appreciated that other metals, and other good heat conductive, thin-walled materials may also be adequate as long as they satisfy the other desirable attributes of being lightweight, durable, and effective in a high temperature environment.

A further aspect of promoting heat exchange relate to surface features of the heat exchange conduit 22. Heat exchange is enhanced when the surface area between the hot and cold areas across which the exchange takes place is maximized. Accordingly, adding exterior surface features such as fins to the conduit 22, in order to increase the effective surface area of the conduit 22, is generally desirable. It can be appreciated that other types of surface features besides fins might also be used with adequate results.

Figure 5:
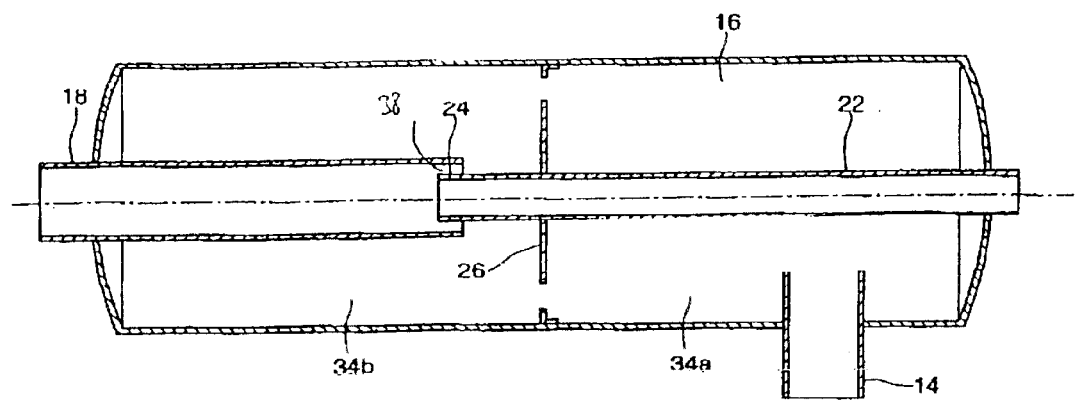
FIG. 5 is a side cross-sectional view of another embodiment of the exhaust muffler of the present invention.
Figure 6:
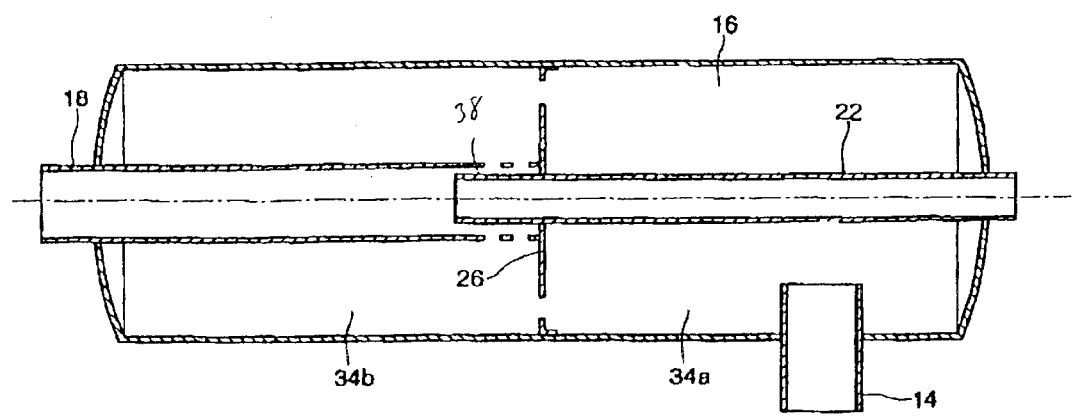
FIG. 6 is a side cross-sectional view of another embodiment of the exhaust muffler of the present invention.

Apart from fins or the like, the present invention also comprehends sizing the conduit and positioning the baffle in the baffled chamber so that more cool surface area is exposed for heat exchange. For example, FIGS. 5 and 6 show a design using a relatively narrow diameter heat exchange conduit 22, of the type suitable for lower horsepower motors needing less air flow. The narrower conduit has a relatively smaller surface area than conduits having a wider diameter, such as those shown in FIGS. 1 and 2. It can be seen that in FIGS. 5 and 6 the internal compartment 34a is relatively long, so that the hot exhaust gas 30 can contact a greater length of heat exchange conduit 22, to offset the effect on heat transfer rates of a smaller surface area of the conduit.

It has also been found that heat exchange between gases is improved when one or both of the gases are turbulent. The hot exhaust gas 30 is generally turbulent simply by the nature of the process of injecting exhaust gas 30 into the baffled chamber. The ambient air 32 flowing inside the heat exchange conduit generally follows a laminar flow, but can be encouraged to become turbulent by modifying the surface features or textures of the interior of the conduit 22. This may include, for example, raised bumps or dents along the inner surface. Such features will disrupt the smooth flow of ambient air 32 and encourage turbulence, thus improving heat transfer rates.

Figure 3:
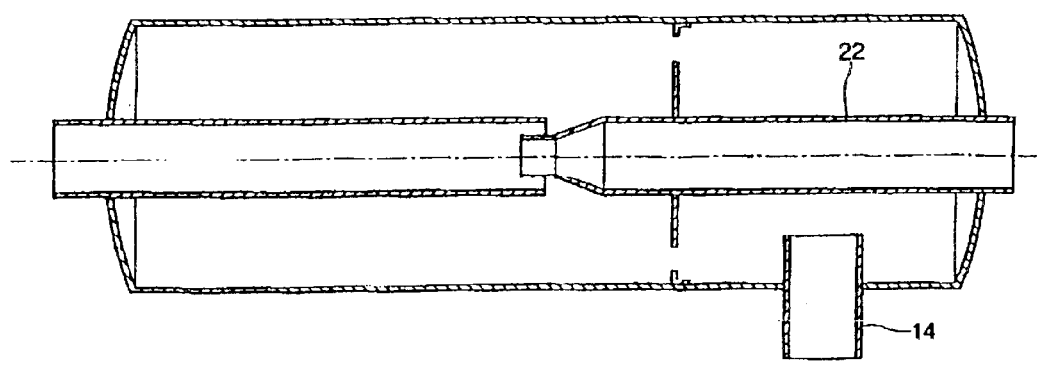
FIG. 3 is a side cross-sectional view of another embodiment of the exhaust muffler of the present invention.
Figure 4:
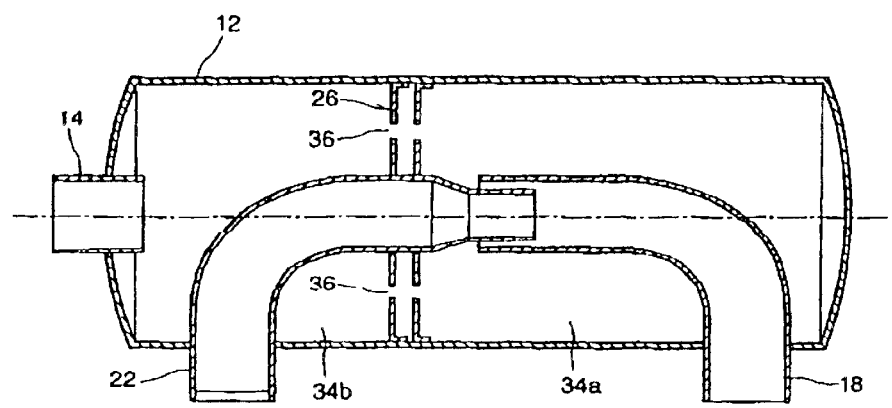
FIG. 4 is a side cross-sectional view of another embodiment of the exhaust muffler of the present invention.

Yet another aspect is that heat exchange is enhanced as the temperature differential or contrast between the hot and cold surfaces increases. Therefore, a given heat exchange system can operate closer to optimum efficiency if it is designed to maximize the exposure of the hottest fluid with the coldest fluid across a heat exchange surface. In the muffler 10 of the present invention, this is achieved by directing the hot exhaust gas 30 from its point of exit from the exhaust inlet 14, where the gas 30 is hottest, onto the heat exchange conduit 22, particularly in the internal compartment 34a where the conduit 22 is immediately attached or adjacent to the fresh-air inlet 20. The conduit 22 will be coldest at this point, where it has just received ambient air 32. This can be seen in the design of FIG. 3, which shows the exhaust gas inlet 14 directed at the heat exchange conduit 22, and where the conduit 22 has been positioned in the middle of the body 12 so that the two elements are positioned adjacent to one another. FIG. 4 shows a variation where the exhaust gas inlet 14 is at the end and the conduit enters from the bottom and curves to meet the exhaust gas outlet 18. Again the inlet 14 is directed at the heat exchange conduit 22 a short distance away to promote heat exchange between the exhaust gases 30 and the fresh air 32 in the heat exchange conduit when the muffler is in use. The exhaust gas inlet 14 can also be directed at the tailpipe 18 to promote heat exchange, since there will be a temperature differential between the hot exhaust gas 30 entering the baffled chamber 16 and the exhaust gas 30 inside the tailpipe 18 which has been cooled by mixture with the ambient air 32. This may be seen in FIG. 2, which shows exhaust gas inlet 14b directed at tailpipe 18.

It can be appreciated that the exterior and interior surface features such as fins, bumps, or dents described above add to the cost of the heat exchange conduit 22. As well, the choice of material will likely involve cost considerations, and the layout of the conduit 22 relative to the inlet 14 may be governed in part by the overall vehicle application and motor compartment space available. Accordingly, it can be appreciated that the design of the muffler 10 of the present invention will involve careful consideration of the various factors in order to maximize heat exchange within the constraints that may be imposed by cost and the parameters of the particular design.

The fresh-air outlet 24 is a passageway, conduit or tube attached to, on, or part of the heat exchange conduit 22, that receives the ambient air 32 from the conduit 22 and transmits it to the tailpipe 18 at the tailpipe input 19. In particular, the fresh-air outlet 24 is sized, shaped, and located relative to the exhaust gas outlet 18 to permit the fresh ambient air 32 to mix with the exhaust gases 30 being vented from the baffled chamber 16, to lower an exit temperature of the exhaust gases 30. Preferably, the fresh-air outlet 24 is sized and shaped to fit within at least a portion of the tailpipe 18, in particular at the tailpipe input end 19.

Preferably, as shown in all of the FIGS. 1–6, the fresh-air outlet is simply a terminal end of the heat exchange conduit 22. In that case, the fresh-air outlet 24 is that portion of the conduit 22 that interfaces or overlaps with the tailpipe 18. In FIGS. 1–4 it can be seen that the heat exchange conduit 22 and tailpipe 18 are of approximately the same diameter. Accordingly, in these embodiments the conduit 22 tapers to form the fresh-air outlet 24, which is a narrower portion that fits within the tailpipe 18 at the tailpipe input end 19. In another embodiment shown in FIGS. 5 and 6, the heat exchange conduit 22 has a diameter uniformly narrower than the diameter of the tailpipe 18. In that case the fresh-air outlet 24 comprises an end portion of the conduit 22 which again fits inside the tailpipe 18 at the tailpipe input end 19. In both cases the exhaust gas 30 enters the tailpipe 18 through an annulus 38, which is the concentric space between the outer diameter of the fresh-air outlet 24 or terminal end of the conduit 22 and the inner diameter of the tailpipe input end 19.

The muffler 10 of the present invention also includes a means to pull or draw the fresh or ambient air 32 into the fresh-air inlet 20 on the heat exchange conduit 22. The means moves the ambient air 32 through the conduit 22 and fresh-air outlet 24, and into the tailpipe 18. This air pulling or air drawing means can be anything that draws in air, including, for example, forced air systems such as fans, blowers, or suction lines. Preferably however the means is a low pressure area created by a simple venturi. A venturi is preferred over forced air systems because it is a passive system that has no moving parts.

A venturi is a tube with a constriction or a small diameter flow area. When a gas or other fluid flows through a venturi it will tend to speed up, to maintain an even flow through the tube. According to the Bernoulli principle, when a gas or fluid speeds up a low pressure area or region is created.

Turning to FIG. 1, it can be seen that a venturi is created at the tailpipe input end 19 due to the orientation of the fresh-air outlet 24 of the heat exchange conduit 22 with the tailpipe 18. In particular, as described above an annulus or venturi 38 is created between the narrower fresh-air outlet 24 and tailpipe 18. The venturi 38 is a constriction in the flow of exhaust gas 30, which otherwise, in a conventional muffler, would be able to flow through the full diameter of the tailpipe 18. As the exhaust gas 30 passes through the venturi 38, it speeds up and creates a low pressure region 40 in front of the fresh-air outlet 24. This region 40 is broadly in the shape of a cone or triangle. The exhaust gas 30 that flows into the tailpipe 18 will tend to bend around the low pressure region 40 as it flows towards the tailpipe output end 21. At the same time, the low pressure region 40 acts to pull or draw in ambient air 32 through the fresh-air inlet 20 and heat exchange conduit 22.

The venturi 38 can also have any shape that is convenient to fit the particular tailpipe and muffler configuration, provided a sufficiently reduced area flow cross-section is presented to create the preferred low pressure region 40. Therefore, as shown in FIGS. 1–4, the venturi 38 may be formed between a narrow tapered fresh-air outlet 24 on the heat exchange conduit 22 and the exhaust gas outlet 18. In another embodiment, as shown in FIGS. 5–6, the heat exchange conduit 22 has a uniform diameter adjacent to the fresh-air outlet 24, and the exhaust gas outlet 18 is sized and shaped to fit around the fresh-air outlet 24 to form the venturi 38. In the embodiment of FIG. 6, the tailpipe input end 19 is perforated adjacent to the venturi 38, to allow for the entry of exhaust gas 30 into the tailpipe 18.

It can be appreciated that the degree of low pressure created by the low pressure region 40 is inversely related to the size of the annulus or venturi 38. As the size of the venturi 38 is reduced, as for example by substituting a larger fresh-air outlet 24, a lower pressure low pressure region 40 is created which draws in a larger volume of ambient air 32. While a larger air flow is generally desirable, if the size of the annulus 38 is reduced too much an undesirable back pressure arises which can block or hinder the flow of exhaust gas 30 from the engine. This can hurt engine performance. Therefore the annulus 38 should not be so small as to create too high a back pressure. By contrast, if the annulus or venturi 38 is too large, which may occur when, for example, the fresh-air outlet 24 is relatively small, the speed of ambient air 32 into the heat exchange conduit 22 may be substantially reduced and the muffler 10 won't cool as efficiently. Therefore, the venturi 38 should be designed so that the cooling function is optimized without creating unacceptable back pressure.

It can be appreciated that when the muffler 10 is in use, the venturi 38 of the present invention is adapted to continuously draw in more ambient air 32 as more exhaust gas 30 is vented. Further, the venturi 38 will draw in the ambient air 32 at a greater rate when the exhaust gas 30 is vented at a greater rate. Accordingly, the venturi 38 may be viewed as having an inherent self regulating capability in that it will generally draw in an appropriate amount of fresh air, proportionate to the demands of the engine.

In the preferred embodiment of the invention, it was found that a variety of tube sizes provided adequate results. These include, for example, a muffler having a tailpipe 18 with an inner diameter of 1.125 inches and a heat exchange tube with a reduced fresh-air outlet section of 0.875 inches (plus wall thickness 0.048"), and another similar muffler with corresponding measurements of 1.13 inches for the tailpipe and 0.8 inch (plus wall thickness 0.048"). The uniform narrow diameter embodiment of FIGS. 5 and 6 produced adequate results with a tailpipe of 1.255 inches inner diameter and a heat exchange tube of 0.625 inches (plus wall thickness 0.048). Using a 16 HP engine running at an engine speed of 3600 rpm, an air velocity of 1500 feet/minute was reached in the heat exchange tube 22. It can be appreciated that other tube sizes and engine speeds may also be used that would produce adequate results.

It can be appreciated that the muffler 10 of the present invention can be simply and easily manufactured using known methods and techniques. In particular, the elements of the body 12, exhaust gas inlet 14, baffled chamber 16, and tailpipe 18 may be readily constructed. As noted above, the elements of the fresh-air inlet 20, heat exchange tube 22, and fresh-air outlet 24 are preferably in the form of a single conduit or tube, where the fresh-air outlet 24 may be a reduced or narrowed section. Accordingly, the combined unit, designated as conduit 22, may be installed in the muffler 10 in a manner similar to that used to install the tailpipe 18. The additional holes to be made in the body 12 and baffle 26 to accommodate the conduit 22 are also similar to the holes made for the tailpipe 18.

It is preferable that the conduit 22 be installed so that the fresh-air outlet 24 is well centered and concentric with the tailpipe input end 19. If the tubes are off-center the low pressure region 40 will be less effectively formed. This will cause less ambient air 32 to be drawn in, and the overall cooling efficiency of the muffler 10 will be reduced.

The operation of the present invention can now be described. When the internal combustion engine is operating, hot exhaust gases 30 will flow into the exhaust gas inlet 14 and the baffled chamber 16, raising the internal temperature of the muffler 10. The gases will circulate between the internal compartments 34, passing through the openings 36 in the baffles 26. The exhaust gases 30 will enter the venturi 38 created between the fresh-air outlet 24 and the tailpipe input end 19 and speed up as they pass through the venturi. This will create a low pressure region 40 inside the tailpipe 18 at the front of the fresh-air outlet 24. The low pressure region 40 will draw or pull in ambient air 32 through the air filter 28, fresh-air inlet 20, heat exchange conduit 22, and fresh-air outlet 24. The ambient air 32 will continue into the tailpipe 18, where it will mix with the exhaust gas 30 until the gas 30 and air 32 are vented into the atmosphere at tailpipe output end 21. As more exhaust gas is vented more fresh air is pulled in. Further, as the power of the engine varies changing the rate at which the exhaust gas vents, the rate at which fresh air is pulled in will also vary in proportion. In this way the cooling effect will be maintained.

The ambient air 32 drawn into the heat exchange conduit 22 will be substantially cooler than the exhaust gas 30. A process of heat exchange or conduction will take place between the hot exhaust gas 30 and the relatively cool heat exchange conduit 22. This process may be facilitated or promoted by design of various features of the heat exchange conduit 22 as discussed above. In the heat exchange, the cooler ambient air 32 will draw heat from inside the muffler 10 and discharge it through the tailpipe 18. Since the ambient air 32 enters the tailpipe 18 where it mixes with exhaust gas 30, the tailpipe 18 will also be cooled relative to the muffler internal temperature, though not to the same extent as the heat exchange conduit 22. Therefore, heat exchange or conduction will also take place between the tailpipe 18 and the exhaust gas 30.

Turning to FIG. 1, it can be seen that internal compartment 34a will be cooled by conduction from the heat exchange conduit 22, and that internal compartment 34b will be largely cooled by conduction from tailpipe 18. Similarly, in the two baffle embodiment of FIG. 2, it can be seen that internal compartment 34a will be cooled by conduit 22, compartment 34b will be cooled by both conduit 22 and tailpipe 18, and compartment 34c will be cooled by conduction with tailpipe 18.

It can therefore now be appreciated how the the operating temperature inside the muffler will be reduced. The lower internal temperature generally has the effect of subjecting the muffler components to less heat stress, so that they achieve enhanced durability. It can also be appreciated that the temperature of the gas vented at the tailpipe output end 21 will be reduced because of the presence of the mixed-in ambient air 32. The lower temperature at the tailpipe output reduces the risk of ignition of foreign materials and of back firing.

Testing of the present invention was carried out on a muffler having a two-baffle embodiment similar to that shown in FIG. 2. The engine used was a 23 HP engine running at a power of 60% and 70% of capacity. The observed temperatures at each power output level were recorded using first a reference muffler not having the heat exchange conduit 22 of the present invention, and then again using the muffler 10 of the present invention.

Upon review, it was found that in the internal compartment 34a the temperature was reduced on average by about 234° F., in the middle internal compartment 34b temperature was reduced by about 170° F., and in internal compartment 34c temperature dropped by about 37° F. At the tailpipe output end 21 the exhaust gas temperature was reduced by about 225° F.

It can now be appreciated that the present invention is suitable for use with internal combustion engine driven vehicles and devices that use a muffler, and that it is particularly suitable for those that are fairly compact, so that the muffler is close to the engine and the exhaust gases remain quite hot at the entry to the muffler. It can also now be readily appreciated that the muffler 10 of the present invention may be easily integrated into the existing motor compartments of the various vehicles and devices, as it has the same basic form factor or shape as conventional mufflers and does not require a heat shield or other bulky external device.

It will be appreciated by those skilled in the art that the foregoing description was in respect of preferred embodiments and that various alterations and modifications are possible within the broad scope of the appended claims without departing from the spirit of the invention. For example, while reference is made to tubular conduits, other shapes and sizes of conduits might also provide reasonable results. Further, different means may be used to improve heat exchange, as taught herein, without departing from the scope of the present invention. Various other modifications will be apparent to those skilled in the art but are not described in any further detail herein.

What is claimed is:

1. An exhaust gas muffler for an engine, said exhaust gas muffler having:
   (a) a body;
   (b) at least one inlet for said exhaust gas from said engine on said body;
   (c) a baffled chamber in said body to receive exhaust gas from said at least one exhaust gas inlet;
   (d) at least one exhaust gas outlet from the baffled chamber to vent said exhaust gas from said baffled chamber;
   (e) a fresh-air inlet on said body, said fresh-air inlet having an air filter positioned to inhibit airborne debris from entering said fresh-air inlet;
   (f) a heat exchange conduit extending into said baffled chamber between said fresh-air inlet and said at least one exhaust gas outlet, said heat exchange conduit being sized and shaped to permit heat exchange between said fresh air and said exhaust gas in said baffled chamber; and
   (g) a fresh air outlet on said heat exchange conduit, said fresh air outlet being sized, shaped and located relative to said exhaust gas outlet to permit said fresh air to mix with exhaust gases being vented from said baffled chamber to lower an exit temperature of said exhaust gases.

2. The exhaust muffler according to claim 1, further including a means to move fresh air through said fresh air inlet and through said heat exchange conduit.

3. The exhaust muffler according to claim 2 wherein said means to move said fresh air comprises a venturi formed between said heat exchange conduit and said at least one exhaust gas outlet.

4. The exhaust muffler according to claim 3 wherein said fresh air outlet is sized and shaped to fit within at least a portion of said at least one exhaust gas outlet to form said venturi, wherein fresh air is drawn into the fresh air inlet by means of a low pressure created at said venturi when said muffler is in use.

5. The exhaust muffler according to claim 4 wherein said venturi is formed between a narrow tapered fresh air outlet on said heat exchange conduit and an exhaust gas outlet conduit.

6. The exhaust muffler according to claim 4 further including an exhaust gas outlet conduit and wherein said heat exchange conduit has a uniform diameter adjacent to said fresh air outlet and said exhaust gas outlet conduit is sized and shaped to fit around said fresh air outlet to form said venturi.

7. The exhaust muffler according to claim 6 wherein said exhaust gas outlet conduit is perforated adjacent to and venturi.

8. The exhaust muffler according to claim 1 wherein said baffled chamber is divided by a baffle into at least two internal compartments, said baffle having at least one opening to enable exhaust gases to pass between said compartments, said heat exchange conduit passing into at least a first one of said internal compartments and said at least one exhaust gas outlet passing out of at least a second one of said internal compartments.

9. The exhaust muffler according to claim 8 wherein, when said muffler is in use, said heat exchange conduit cools at least said first internal compartment.

10. The exhaust muffler according to claim 8 wherein, when said muffler is in use, said exhaust gas outlet cools at least said second internal compartment.

11. The exhaust muffler according to claim 8 wherein said heat exchange conduit passes through said baffle, and said opening in said baffle is adjacent to said heat exchange conduit to cause said exhaust gases to pass adjacent to said heat exchange conduit when said muffler is in use.

12. The exhaust muffler according to claim 8 wherein said baffle includes a plurality of openings and said openings are spaced about said baffle to promote turbulent flow of said exhaust gasses through said baffle chamber when said muffler is in use to promote heat exchange between said heat exchange conduit and said exhaust gases.

13. The exhaust muffler according to claim 8 wherein said baffled chamber includes at least two baffles which divide the baffled chamber into at least three internal compartments wherein the heat exchange conduit passes into one or more of said internal compartments and the exhaust gas outlet passes out from at least one internal compartment to at least partially cool said one or more internal compartments by conduction.

14. The exhaust muffler according to claim 1 wherein said exhaust gas inlet is directed at said heat exchange conduit to promote heat exchange between the exhaust gases and said fresh air through said heat exchange conduit when said muffler is in use.

15. The exhaust muffler according to claim 1 wherein said body includes an exhaust gas outlet conduit and said exhaust gas inlet is directed at said exhaust gas outlet conduit to promote heat exchange between cooled exhaust gas in said exhaust gas outlet conduit and hot exhaust gas entering said baffle chamber through said exhaust gas inlet when said muffler is in use.

16. An exhaust gas muffler for an engine, said exhaust gas muffler having:
    (a) a body;
    (b) at least one inlet for said exhaust gas from said engine on said body;
    (c) a baffled chamber in said body to receive exhaust gas from said at least one exhaust gas inlet;
    (d) at least one exhaust gas outlet from the baffled chamber to vent said exhaust gas from said baffled chamber;
    (e) at least one fresh-air inlet on said body, said fresh-air inlet having an air filter positioned to prevent airborne debris from entering said fresh-air inlet;
    (f) a heat exchange conduit extending into said baffled chamber between said fresh-air inlet and said at least one exhaust gas outlet, said heat exchange conduit being sized and shaped to permit heat exchange between said fresh air and said exhaust gas in said baffled chamber; and
    (g) a means to draw fresh air into said fresh-air inlet on said heat exchange conduit.

17. The exhaust muffler according to claim 16 wherein said means to draw fresh air into said fresh-air inlet draws in more fresh air as more exhaust gas is vented when said muffler is in use.

18. The exhaust muffler according to claim 16 wherein said means to draw in more fresh air draws in fresh air at a greater rate when said exhaust gas is vented at a greater rate, when said muffler is in use.

19. An exhaust gas muffler for an engine, said exhaust gas muffler having:
    (a) a body;
    (b) at least one inlet for said exhaust gas from said engine on said body;
    (c) a baffled chamber in said body to receive exhaust gas from said at least one exhaust gas inlet;
    (d) at least one exhaust gas outlet from the baffled chamber to vent said exhaust gas from said baffled chamber;
    (e) at least one fresh-air inlet on said body;
    (f) a heat exchange conduit extending into said baffled chamber between said fresh air inlet and said at least one exhaust gas outlet, said heat exchange conduit being sized and shaped to permit heat exchange between said fresh air and said exhaust gas in said baffled chamber;
    (g) a fresh air outlet on said heat exchange conduit, said fresh air outlet being sized, shaped and located relative to said exhaust gas outlet to permit said fresh air to mix with exhaust gases being vented from said baffled chamber to lower an exit temperature of said exhaust gases; and
    (h) a means to move fresh air through said fresh air inlet and through said heat exchange conduit, said means to move fresh air comprising a venturi formed between said heat exchange conduit and said at least one exhaust gas outlet, said fresh air outlet being sized and shaped to fit within at least a portion of said at least one exhaust gas outlet to form said venturi, said venturi being formed between a narrow tapered fresh air outlet on said heat exchange conduit and an exhaust gas outlet conduit;
wherein fresh air is drawn into the fresh air inlet by means of a low pressure created at said venturi when said muffler is in use.

20. An exhaust gas muffler for an engine, said exhaust gas muffler having:
    (a) a body;
    (b) at least one inlet for said exhaust gas from said engine on said body;
    (c) a baffled chamber in said body to receive exhaust gas from said at least one exhaust gas inlet;
    (d) at least one exhaust gas outlet from the baffled chamber to vent said exhaust gas from said baffled chamber;
    (e) at least one fresh-air inlet on said body;
    (f) a heat exchange conduit extending into said baffled chamber between said fresh air inlet and said at least one exhaust gas outlet, said heat exchange conduit being sized and shaped to permit heat exchange between said fresh air and said exhaust gas in said baffled chamber;
    (g) a fresh air outlet on said heat exchange conduit, said flesh air outlet being sized, shaped and located relative to said exhaust gas outlet to permit said fresh air to mix with exhaust gases being vented from said baffled chamber to lower an exit temperature of said exhaust gases;
    (h) a means to move fresh air through said fresh air inlet and through said heat exchange conduit, said means to move said fresh air comprising a venturi formed between said heat exchange conduit and said at least one exhaust gas outlet, said fresh air outlet being sized and shaped to fit within at least a portion of said at least one exhaust gas outlet to form said venturi;
    (i) further including an exhaust gas outlet conduit, and wherein said heat exchange conduit has a uniform diameter adjacent to said fresh air outlet and said exhaust gas outlet conduit is sized and shaped to fit around said fresh air outlet to form said venturi, and said exhaust gas outlet conduit is perforated adjacent to said venturi;
wherein fresh air is drawn into the fresh air inlet by means of a low pressure created at said venturi when said muffler is in use.

* * * * *